United States Patent

[11] 3,559,742

| [72] | Inventor | Joe B. Rogillio, Sr.<br>2211 Oxford, Houston, Tex. 77008 |
|---|---|---|
| [21] | Appl. No. | 743,229 |
| [22] | Filed | July 8, 1968 |
| [45] | Patented | Feb. 2, 1971 |

[54] EDGER DEVICE
3 Claims, 2 Drawing Figs.

[52] U.S. Cl. ............... 172/15, 56/256
[51] Int. Cl. ............... A01b 9/00
[50] Field of Search ............... 172/15; 56/25.4, 256

[56] References Cited
UNITED STATES PATENTS

| 2,902,097 | 9/1959 | Cairns | 172/15 |
| 2,913,058 | 11/1959 | Smith et al. | 172/15 |
| 3,006,421 | 10/1961 | Feilbach | 172/15 |
| 2,581,477 | 1/1952 | Franks | 172/15UX |
| 2,778,233 | 1/1957 | Perry | 172/15X |
| 3,192,693 | 7/1965 | Bergeson | 56/256X |

Primary Examiner—Robert E. Bagwill

ABSTRACT: A device for edging lawns, yards, sidewalks, and driveways having a belt driven shaft which is mounted in variance, the shaft receiving threadably at each end an edger blade. The edger blade is secured to the shaft by a threaded nut. A fender is also carried upon the platform of the edger for safety reasons.

PATENTED FEB 2 1971　　　　　　　　　　　　　3,559,742

INVENTOR.
*Joe B. Rogillio, Sr.*

EDGER DEVICE

This invention relates to lawn edger apparatus and more particularly to an improved edger device.

It is therefore the main purpose of this invention to provide an edger device which will efficiently utilize shaft driven edger blades and a throw to clean out the debris.

Another object of this invention is to provide an edger device which will utilize a blade either on the right or left side which will be able to reach hard to get places in order to neatly trim grasses.

Still another object of this invention is to provide an edger device which will be gasoline or electrically powered and an edger blade shaft will be driven from the power source.

Other objects of the present invention are to provide an edger which is simple in design, inexpensive to manufacture, rugged in construction, easy to use and efficient in operation.

Figure 1:
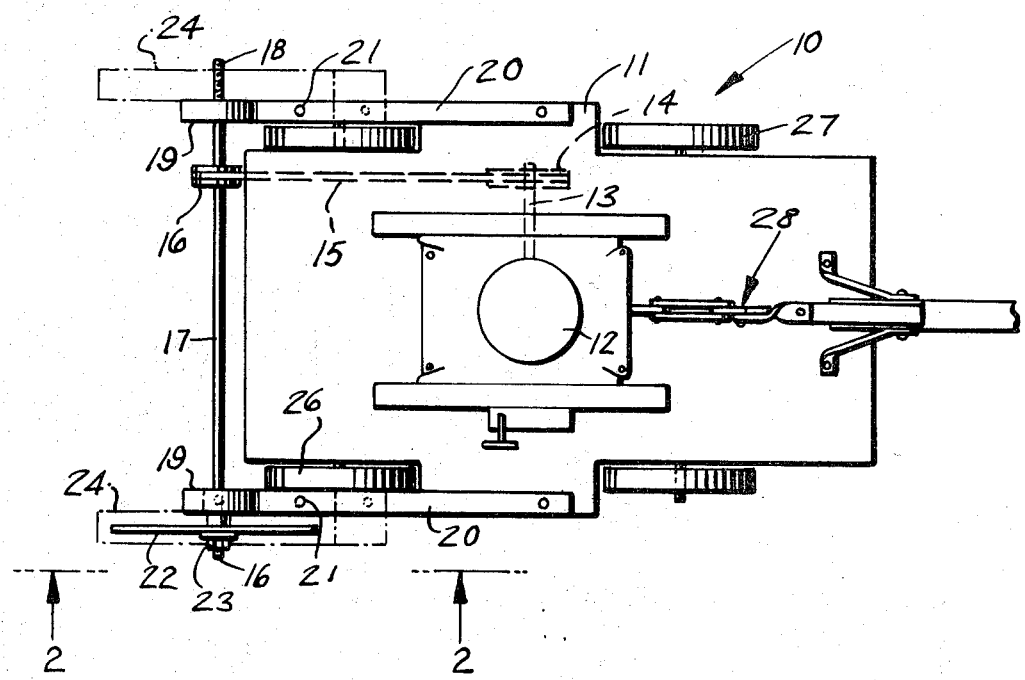
Figure 2:
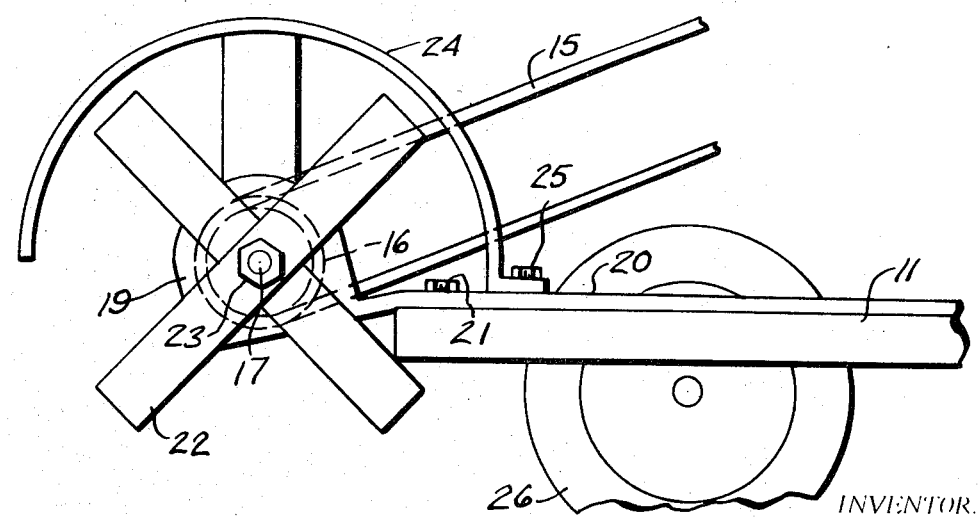

These and other objects will become readily apparent upon a study of the following specification together with the accompanying drawing wherein:

FIG. 1 is a fragmentary top plan view of the present invention showing the blade in phantom lines; and FIG. 2 is an enlarged view taken along the lines 2–2 of FIG. 1.

According to this invention, an edger device 10 is provided with a platform 11 to which is secured a motor 12 which may be gasoline or electrically powered. Motor 12 is provided with a shaft 13 to which is secured a pulley 14. An endless belt 15 is carried by pulley 14 and pulley 16. Pulley 16 is secured to shaft 17 forwardly of device 10. The shaft ends 18 of shaft 17 are supported within bearings 19 which overhang the forward end of platform 11. The bearings 19 are supported within the forward ends of brackets 20 which are secured to platform 11 of device 10 by means of fasteners 21. On the threaded ends 18 of shaft 17 may be secured an edger blade 22 and throw which will be optional, which are secured stationary to shaft 17 by nut fastener 23. A fender guard 24 partially encompasses edger blade 22 for safety reasons and is secured to platform 11 by means of fasteners 25 which are secured through brackets 20 to platform 11 of device 10. Platform 11 is supported on forward wheels 26 and rearward wheels 27, all of which are supported in the well known manner familiar to the art. Device 10 also provided with a shift lever 28 to loosen or tighten belt 15 whereby the cutter and throw may be stopped or driven.

It will be noted that each end of shaft 17 is externally threaded, one clockwise and the other counterclockwise in order to receive the corresponding nut fasteners 23.

The instant edger device is adapted to make a clean trench adjacent concrete walks drives, curbs or fences, and be converted to either right or left hand operation by removing a single nut.

I claim:

1. An edger device comprising a wheel-supported platform, a motor movably mounted thereon, a drive shaft extending from said motor, shift means mounted on said platform and adjacent said motor, and operatively connected therewith whereby movement of said shift means in a predetermined direction will control the movement of said motor fore and aft on said platform, a pair of brackets, each mounted on a side of said platform and extending forwardly thereof, bearings mounted in said brackets and an edger shaft having like ends rotatably mounted therein and extending transversely of the direction of travel, a throw mounted on one of the shaft ends, an edger blade mounted adjacent said throw, the longitudinal axes of said throw and blade being substantially perpendicular to one another when in use, and means on said shaft end securing the throw and blade from outward lateral movement.

2. An edger device according to claim 1, wherein said motor is a gasoline motor.

3. An edger device according to claim 1, and further comprising a fender guard mounted on each of said brackets and being adapted to encircle at least half the peripheral area of the blade path, whether the blade is mounted on either side of the shaft.